United States Patent
Crosby et al.

(10) Patent No.: US 10,313,263 B2
(45) Date of Patent: *Jun. 4, 2019

(54) APPARATUS, SYSTEM, AND METHOD FOR ORDERING AND PROVISIONING VARIABLE BANDWIDTH CAPACITY ON A NETWORK

(71) Applicant: LEVEL 3 COMMUNICATIONS, LLC, Broomfield, CO (US)

(72) Inventors: Kelly R. Crosby, Denver, CO (US); Benjamin W. Garrard, Superior, CO (US); Jeff King, Broomfield, CO (US); Scott A. Nusz, Broomfield, CO (US); Monisha Merchant, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/844,853

(22) Filed: Dec. 18, 2017

(65) Prior Publication Data

US 2018/0123970 A1    May 3, 2018

Related U.S. Application Data

(63) Continuation of application No. 15/376,266, filed on Dec. 12, 2016, now Pat. No. 9,847,952, which is a continuation of application No. 13/468,912, filed on May 10, 2012, now Pat. No. 9,521,041.

(60) Provisional application No. 61/484,618, filed on May 10, 2011.

(51) Int. Cl.
*H04Q 11/00* (2006.01)
*H04L 12/925* (2013.01)
*H04L 12/24* (2006.01)
*H04J 14/02* (2006.01)

(52) U.S. Cl.
CPC ........ *H04L 47/722* (2013.01); *H04L 41/0896* (2013.01); *H04Q 11/0066* (2013.01); *H04J 14/0257* (2013.01); *H04Q 2011/0086* (2013.01); *H04Q 2213/13332* (2013.01); *H04Q 2213/13523* (2013.01)

(58) Field of Classification Search
CPC .............. H04L 47/722; H04L 41/0896; H04Q 2011/0086; H04Q 2213/13523
See application file for complete search history.

(56) References Cited

U.S. PATENT DOCUMENTS

| | | | |
|---|---|---|---|
| 6,738,816 B1 * | 5/2004 | Momona | ........... H04L 12/40058 709/223 |
| 7,009,991 B2 * | 3/2006 | Shachar | .................. H04L 12/43 370/436 |
| 7,058,012 B1 * | 6/2006 | Chen | ........................ H04J 3/14 370/222 |

(Continued)

*Primary Examiner* — Mohamed A Kamara

(57) ABSTRACT

Systems and methods for automatic purchasing, reserving and/or provisioning of a wavelength bandwidth block are disclosed. A user may access a web page, such as an interactive web-portal, to provide bandwidth data and corresponding ordering information for reserving a particular amount of bandwidth capacity on a telecommunications network. Subsequently, the customer's may access and the bandwidth blocks to increase/decrease and/or activate/deactivate portions of the reserved bandwidth capacity as needed.

16 Claims, 5 Drawing Sheets

(56) References Cited

U.S. PATENT DOCUMENTS

| | | | |
|---|---|---|---|
| 7,433,311 B1* | 10/2008 | Kalyanasundaram | ........................ H04L 41/5029 370/235 |
| 7,751,437 B2 | 7/2010 | Spinar et al. | |
| 9,521,041 B2* | 12/2016 | Crosby | ............... H04L 41/0896 |
| 9,847,952 B2* | 12/2017 | Crosby | ............... H04L 41/0896 |
| 2002/0129181 A1 | 9/2002 | Lahiri | |
| 2003/0112766 A1 | 6/2003 | Riedel et al. | |
| 2003/0202534 A1 | 10/2003 | Clooman | |
| 2006/0268739 A1 | 11/2006 | Garcia et al. | |
| 2008/0112400 A1* | 5/2008 | Dunbar | ................... H04L 12/66 370/360 |
| 2011/0126244 A1 | 5/2011 | Hasek | |
| 2013/0022056 A1 | 1/2013 | Crosby et al. | |
| 2017/0093744 A1 | 3/2017 | Crosby et al. | |

* cited by examiner

APPARATUS, SYSTEM, AND METHOD FOR ORDERING AND PROVISIONING VARIABLE BANDWIDTH CAPACITY ON A NETWORK

RELATED APPLICATIONS

The present non-provisional utility application is a continuation of and claims the benefit of priority to U.S. patent application Ser. No. 15/376,266, titled "APPARATUS, SYSTEM, AND METHOD ORDERING AND PROVISIONING VARIABLE BANDWIDTH CAPACITY ON A NETWORK," filed on Dec. 12, 2016, the entire contents of which are fully incorporated by reference herein for all purposes. Application Ser. No. 15/376,266 is a continuation of and claims the benefit of priority to U.S. patent application Ser. No. 13/468,912, titled "APPARATUS, SYSTEM, AND METHOD ORDERING AND PROVISIONING VARIABLE BANDWIDTH CAPACITY ON A NETWORK," filed on May 10, 2012, and issued as U.S. Pat. No. 9,521,041 on Dec. 13, 2016, the entire contents of which are fully incorporated by reference herein for all purposes. Application Ser. No. 13/468,912 claims priority under 35 U.S.C. § 119(e) to U.S. Provisional Application No. 61/484,618, titled "ORDERING AND PROVISIONING OF NETWORK SERVICES," filed on May 10, 2011, the entire contents of which are fully incorporated by reference herein for all purposes.

TECHNICAL FIELD

Aspects of the present disclosure relate to network communications, and more particularly, the ordering of network services by customers and the corresponding provisioning of those network services for the customers.

BACKGROUND

Customers access high-speed networks, such as telecommunication networks, for many different types of data services, such as voice, enterprise applications, data storage, images, video and/or any combination thereof. Typically, each of the various data services used by a customer has different requirements with regards to latency, routing, and bandwidth capacity. For example, customers often need telecommunication infrastructure and/or services that are capable of supporting short-term increases in bandwidth usages, unpredictable bandwidth usages, and/or large bandwidth requirements simultaneously. As another example, with the explosion of cloud computing and a corresponding increase in bandwidth requirements for data center networking applications, customers are looking for the ability to utilize high bandwidth for a limited amount of time.

Accordingly, customers are increasingly looking to service providers to offer the network infrastructure to support short-term, unpredictable, and large bandwidth requirements. While some networking solutions such as Multiprotocol Label Switching ("MPLS") provide usage-based and burstable capabilities across a shared network, customers may still require the fixed and predictable latency, fully dedicated bandwidth, and custom-routing features provided by a network's Layer 1 optical transport capabilities. It is with these concepts, among others, that various aspects of the present disclosure were conceived.

SUMMARY

According to one aspect, a system for reserving bandwidth is disclosed. The system includes a first network node server comprising at least one line-side port to communicate data at a maximum bandwidth capacity on a network. The first network node server also includes a plurality of tributary ports, each tributary port of the plurality of tributary ports for communicating the data at a percentage of the maximum bandwidth capacity. The system includes at least one processor configured to perform one or more steps for reserving bandwidth. For example, the processor may be configured to receive input to reserve the maximum bandwidth capacity on the network. The processor may be further configured to process the input to generate a reservation for communicating data by assigning the maximum bandwidth capacity to the at least one line-side capacity port and assigning the percentage of the maximum bandwidth capacity to at least one of the plurality of tributary ports According to another aspect, another system for reserving bandwidth is disclosed. The system includes a first network node server comprising at least one line-side port to communicate data at a maximum bandwidth capacity on a network. The first network node server also includes a plurality of tributary ports, each tributary port of the plurality of tributary ports for communicating the data at a percentage of the maximum bandwidth capacity. The system includes a second network node server comprising at least one other line-side port to communicate data at the maximum bandwidth capacity on the network. The first network node server also includes a plurality of other tributary ports, each tributary port of the plurality of tributary ports for communicating the data at a percentage of the maximum bandwidth capacity.

The system further includes at least one processor configured to perform one or more steps for reserving bandwidth. For example, the processor may be configured to receive input to reserve the maximum bandwidth capacity on the network. The processor may be further configured to process the input to generate a reservation for communicating data by assigning the maximum bandwidth capacity to the at least one line-side capacity port, assigning the percentage of the maximum bandwidth capacity to at least one of the plurality of tributary ports, assigning the maximum bandwidth capacity to the at least one other line-side capacity port, and assigning the percentage of the maximum bandwidth capacity to at least one of the plurality of other tributary ports.

In yet another aspect, a method for reserving bandwidth is disclosed. The method includes receiving input to reserve a maximum bandwidth capacity on a network. The method also includes processing the input to generate a reservation for communicating data with a network node server within the network by: assigning a maximum bandwidth capacity to at least one line-side capacity port and assigning the percentage of the maximum bandwidth capacity to at least one of the plurality of tributary ports, wherein the network node comprises the at least one line-side port and the plurality of tributary ports.

BRIEF DESCRIPTION OF THE DRAWINGS

The foregoing and other objects, features, and advantages of the present disclosure set forth herein will be apparent from the following description of exemplary embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only exemplary embodiments of the present disclosure and, therefore, are not to be considered limiting in scope.

DETAILED DESCRIPTION

Figure 1:
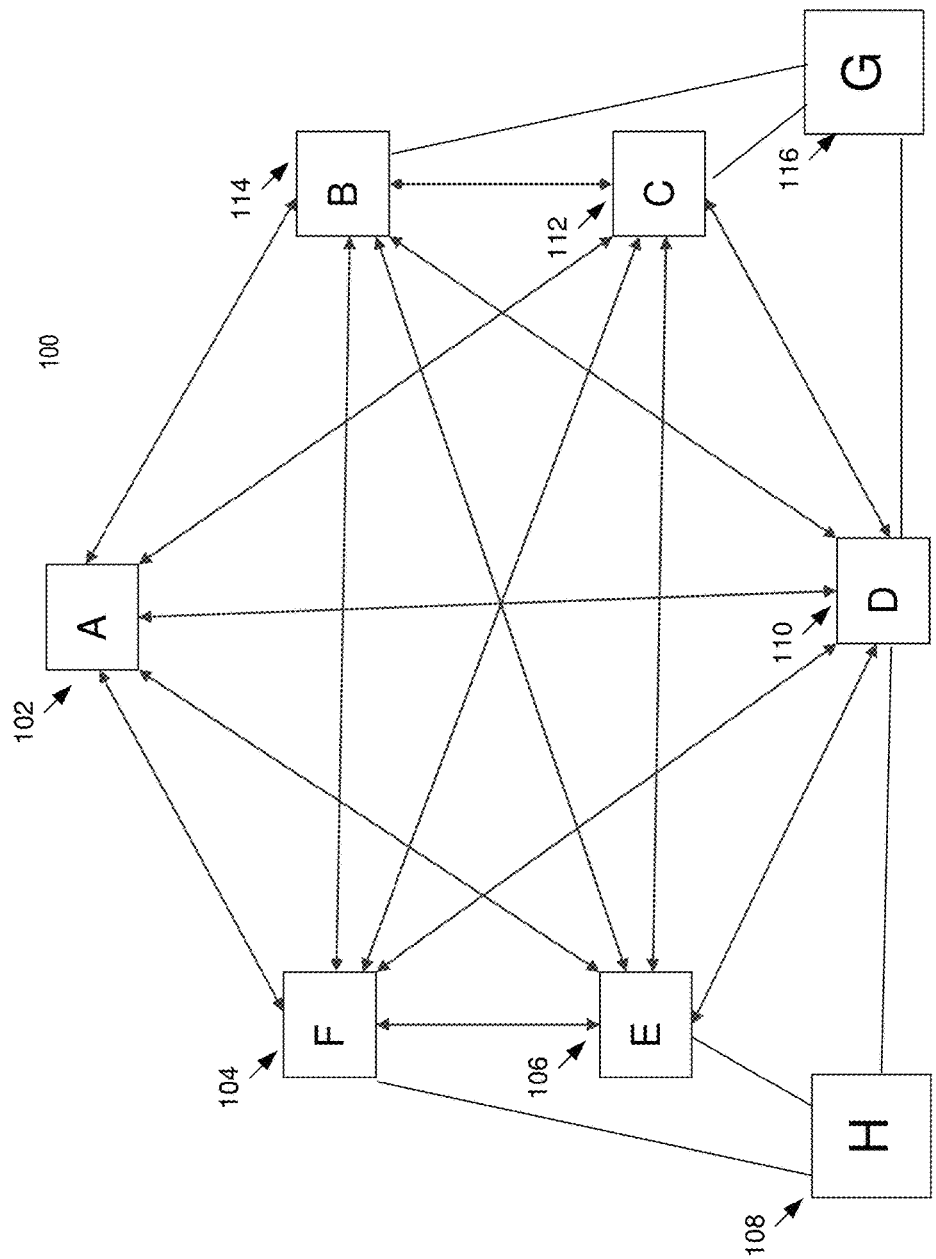
FIG. 1 is a block diagrams illustrating an example networking environment, according to aspects of the present disclosure.

Aspects of the present disclosure offer network users, such as corporations, educational or governmental institutions, and/or other entities, a cost-efficient solution for accessing various amounts of bandwidth capacity at a fractional cost. In various aspects, users may purchase, and/or otherwise provision one or more wavelength bandwidth blocks to reserve access to a specific amount of bandwidth capacity on a telecommunications network. A wavelength bandwidth block ("WBB") represents a pre-purchased or reserved bandwidth capacity between two specific locations on a network. For example, a WBB may reserve 100 gigabytes of bandwidth capacity between a data center building in Philadelphia and a data center in California on a DWDM optical telecommunication network.

The physical infrastructure required to support the reserved bandwidth capacity may be pre-positioned and/or installed at the respective locations between which the WBB is reserved. For example, with respect to an optical network, physical infrastructure such as base fiber and corresponding optical networking components such as switches, ports, routers, etc., may be installed and/or pre-positioned at both locations. A user may access, such as through an interface, the provisioned WBB and activate/deactivate portions and/or percentages of the reserved bandwidth capacity to increase/decrease the user's bandwidth consumption. Subsequently, the user may automatically be billed based on the users WBB reservation and bandwidth consumption using a two tiered approach: first, the customer may automatically be billed a fractional flat rate for provisioning a WBB to reserve a specific amount of bandwidth capacity on the network; and second, the customer may automatically be billed a variable rate based on the customer's actual bandwidth consumption.

Historically, consumers of various network services have invested large amounts of capital into leasing "dark fibers" from telecommunication service providers. Dark fiber refers to optical fiber infrastructure that has been installed but has not been activated (e.g. the optical fiber does not have the necessary devices to generate or receive an optical signal). Such installation can be difficult and costly, such as when fiber is routed through metropolitan areas. Specifically, the consumer will make a large upfront payment to a network service provider to provision and route a specific amount of bandwidth that will support the customer's current and projected future bandwidth needs. Generally, the consumers pay the entire fee for dark fiber to carry the bandwidth capacity regardless of when the customer makes the additional investment of networking equipment to actually transmit and receive data over the fiber. Thus, the "dark fiber" is present but the networking equipment must still be installed in order to "light" the dark fiber. With the systems and methods of the present disclosure, in contrast, a consumer may have full control over reserved bandwidth capacity via a WBB, while leveraging shared network economics by paying fractional costs for bandwidth reservations and actual costs for bandwidth consumption, among other advantages.

FIG. 1 illustrates an example networking environment 100 for providing bandwidth on demand to users. As discussed herein, the term "bandwidth on demand" refers to the ability of a network user to activate/deactivate portions and/or percentages of a bandwidth capacity to increase and/or decrease their bandwidth consumption. The network may be an optical telecommunication network capable of providing high-capacity optical transmission over fiber connected between various types of networking devices, such as switches, routers, gateways, and the like. According to one aspect, the network may be a managed protected Layer 1 network with fixed nodes (e.g. nodes A (102)-H (116)), or may be an unprotected network. Additionally, the network may be capable of implementing mesh routing, diveristy/triversity, maximization of redundancy, and/or other network techniques and topologies, and the network and/or portions of the network may be dedicated to a particular user. In such various possible configurations, each node may connect to and/or communicate with a bandwidth application 208 that provides users with the ability to purchase and/or otherwise provision a WBB to reserve a specific amount of bandwidth capacity in the form of a WBB. Subsequently, users may access the WBB to activate/deactivate portions and/or percentages of the bandwidth capacity to increase or decrease the user's bandwidth consumption.

In one particular embodiment, the network 100 may be a fiber optic telecommunication network implementing a Dense Wavelength Multiplexing (DWDM) Transmit system (or DWDM infrastructure) that is configured to transmit data bi-directionally using one or more specific wavelengths. DWDM is a technology that increases the capacity of an optical fiber by first assigning incoming optical signals to specific wavelengths of light (colors) within a designated band and then combining or multiplexing multiple optical signals so that they can be amplified as a group and transmitted over a single fiber or pair of fibers to increase capacity. Each optical signal can be at a different rate and in a different format. Example DWDM applications may include ultra-high bandwidth long haul as well as ultra-high-bandwidth metropolitan or inner city-networks, and access networks that are closer to the end user such as G.709, SONET, Internet protocol (IP), and asynchronous transfer mode (ATM) networks.

Figure 2:
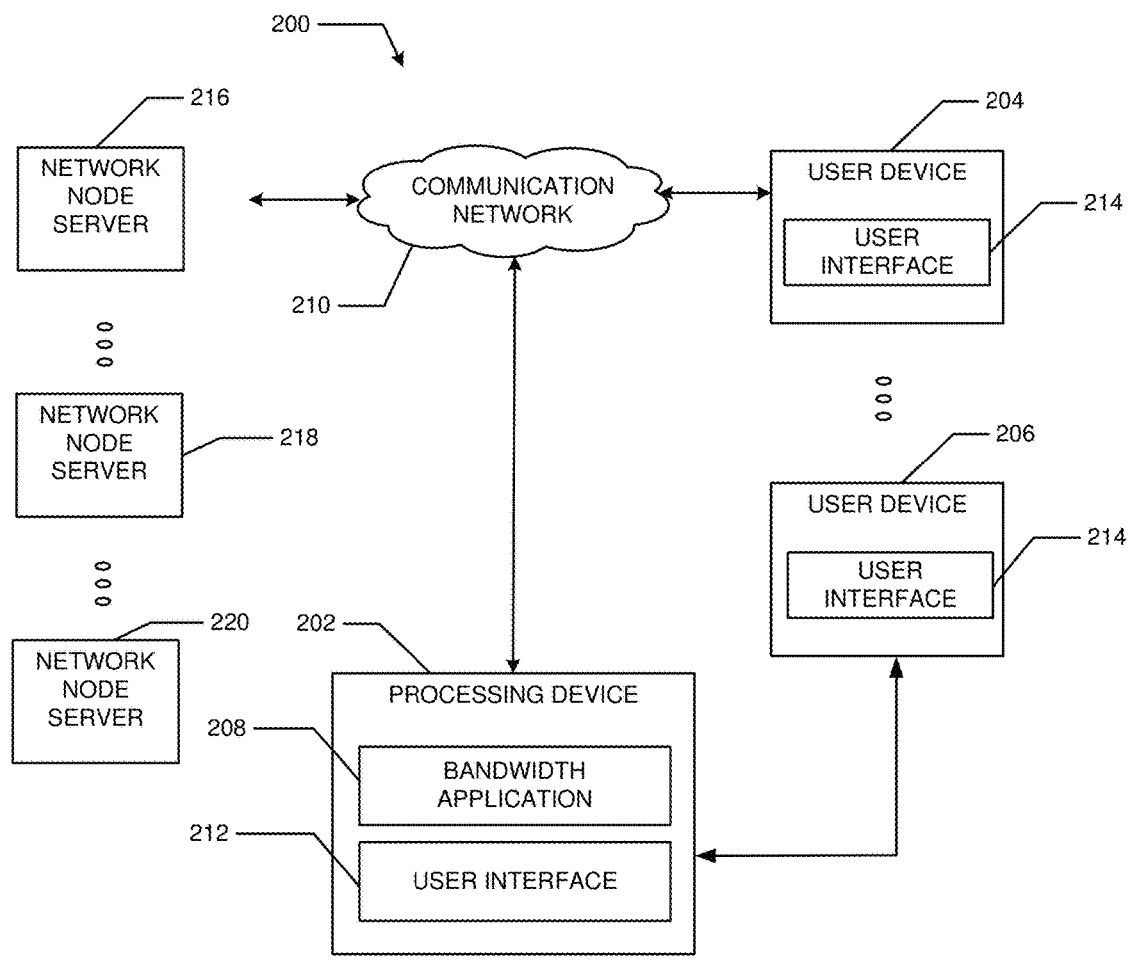
FIG. 2 is a block diagram illustrating a computing environment for provisioning bandwidth capacity, according to aspects of the present disclosure.

FIG. 2 illustrates an example computing environment 200 that may implement various embodiments of the present disclosure, such as providing bandwidth on demand. The computing environment may access and/or otherwise be integrated with a networking environment, such as the networking environment depicted in FIG. 1. A processing device 202 and/or user devices 204-206 may include various hardware and accompanying software computing components that may be configured for provisioning one or more WBBs to reserve bandwidth capacity. Once a WBB has been provisioned, a user, such as a customer of a network service provider, may access a WBB to manage unpredictable bandwidth growth and demand across their networks, without the large, upfront investment, such as pre-purchasing dark fiber and/or dedicated DWDM systems. Thus, while users may be encouraged by service providers, such as DWDM hardware vendors, to acquire expensive dark fiber connectivity, aspects of the present disclosure provides users with the network control and flexibility of a customer-owned network and corresponding pricing schemes that allows the users to pay a fractional rate for reserving bandwidth capacity on the front-end by provisioning one or more WBBs and an additional variable rate for actual bandwidth consumption on the back-end, all while taking advantage of the various benefits of the network on which the WBBs were provisioned, such as a route diversity and triversity, load-balancing, redundancy, etc.

For example, the processing device 202 may execute a bandwidth application 108 that provisions WBBs and subsequently allows users to activate/deactivate portions and/or percentages of the bandwidth capacity to increase or decrease the user's bandwidth consumption. The bandwidth application 208 may be located on the processing device 202 and/or on the user devices 204-206, or elsewhere.

The processing device 202 and/or the user devices 204-206 may be a personal computer, work station, server, mobile device, mobile phone, processor, and/or other processing device. Each device may include one or more processors that process software or other machine-readable instructions and may include a memory to store the software or other machine-readable instructions and data. The memory may include volatile and/or non-volatile memory. Additionally, each device may also include a communication system to communicate via a wireline and/or wireless communications, such as through the Internet, an intranet, and Ethernet network, a wireline network, a wireless network, and/or another communication network. The processing device 202 and/or the user devices 204-206 may further include a display (not shown) for viewing data, such as a computer monitor, and an input device (not shown), such as a keyboard or a pointing device (e.g., a mouse, trackball, pen, touch pad, or other device) for entering data and navigating through data, including exams, images, documents, structured data, unstructured data, HTML pages, other web pages, and other data.

According to one aspect, the processing device 202 and/or the user devices 204-206 may include a user-interface (UI) 212 and 214 to receive input from a user to provision WBBs. UIs 212 and 214 may include a display (not shown) such as a computer monitor, liquid crystal display, for viewing data and/or input forms, and any combination of input/output devices (not shown), such as a keyboard, or a pointing device (e.g., a mouse, trackball, pen, or touch pad), speaker, and/or any other type of input device.

The user devices 204-206, processing device 202, and/or network node servers 216-220, may communicate with through a communication network 210, which may be the Internet, an intranet, a local area network, a wireless local network, a wide area network, or another communication network, as well as combinations of networks. For example, the user devices 204-206 may communicate with the processing device 202 through a private network to reserve bandwidth capacity. In another aspect, the user devices 204-206 may communicate with the processing device 202 directly such as through an Ethernet connection. While aspects of the present disclosure have been described as being performed using multiple devices within a computing environment, such as computing environment 200 shown in FIG. 2, it is contemplated that such aspects may be performed locally, using only a single device, such as the processing device 202 and in such cases the user device is integrated to or otherwise in direct connection with the processing device 202.

According to one aspect, a user, such as customer, may access a user device 204-206 to purchase and/or provision one or more WBBs to reserve bandwidth capacity. Each WBB is provisioned to reserve a specific amount of wavelength bandwidth capacity between at least at least two network node servers 216-218. In particular, a WBB is provisioned to reserve bandwidth capacity, as will be further described below, by assigning and/or otherwise associating one or more ports of the network node servers 216-218 to a particular user. For example, referring again to FIG. 1, a WBB may be provisioned to reserve 75 gigabytes of wavelength bandwidth capacity between A and G. As another example, a user may provision a WBB to reserve 50 gigabytes of wavelength bandwidth capacity between F and D. Subsequently, the user may access the provisioned WBB to activate/deactivate portions and/or percentages of the bandwidth capacity reserved by the WBB to increase or decrease the user's bandwidth consumption.

Figure 3A:
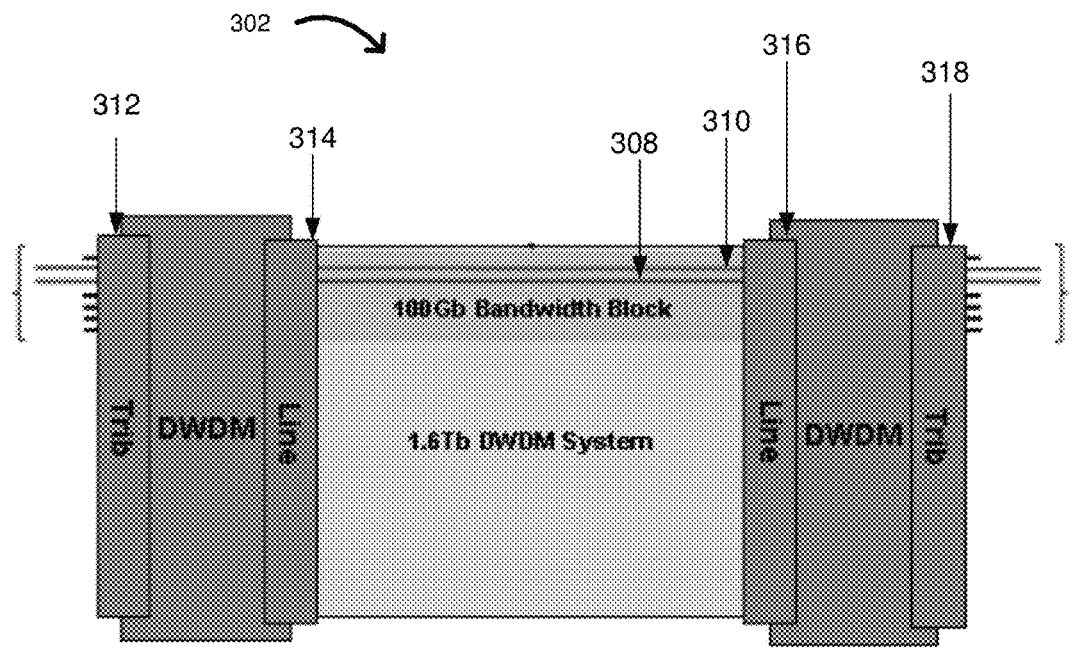
FIGS. 3A and 3B are block diagram illustrating a wavelength bandwidth block, according to aspects of the present disclosure

FIG. 3A illustrates an example WBB that may be purchased and/or provisioned by a user, such as a customer, to reserve a specific amount of bandwidth capacity. As shown, WBB 302 is a reservation of a specific amount of wavelength bandwidth capacity between two network node servers (e.g. between network node servers 216 and 220 of FIG. 2), as illustrated by building A Chicago 304 and building B New York 306. Each WBB may include one or more customer-dedicated line-side capacity ports 314 and 316, and one or more corresponding tributary capacity ports 312 and 318. The line-side capacity ports provide access to a maximum amount of bandwidth on a network provider's network dedicated for a particular user. Accordingly, in the example illustrated in FIG. 3A, the line-side capacity ports provide access to a maximum of 100 gigabytes of bandwidth capacity reserved by the WBB 302 on a network providers network. The tributary ports 312 and 318 are capable of communicating—transmitting and/or receiving—at least a portion and/or percentage of the 100 gigabyte maximum bandwidth capacity that is reserved by the WBB 302 and accessible via the line-side capacity ports 314 and 316 to the user/customer.

Figure 3B:
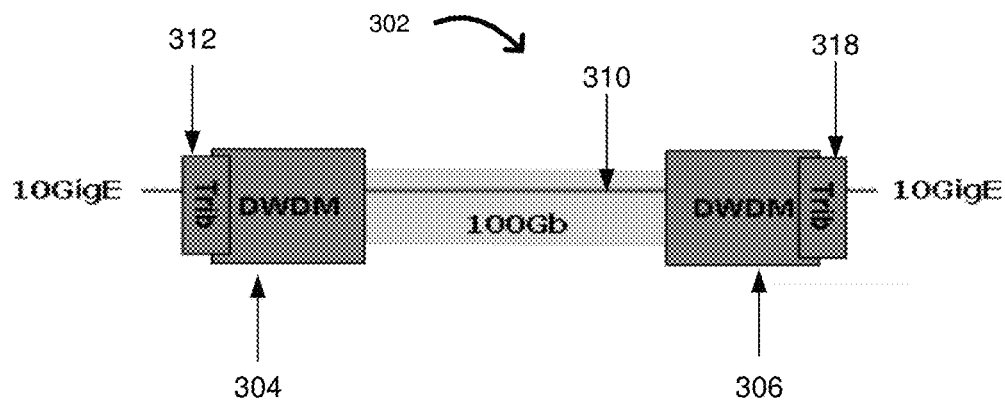

Each WBB may include one or more service channels 308 and 310. The service channels represent point-to-point wavelength circuits capable of consuming a portion and/or percentage of the bandwidth capacity reserved by the WBB. Stated differently, each service channel may represent a discrete physical path between two points in a network. For example, in one particular embodiment, in conjunction with a network implementing DWDM, a service channel may represent an individual wavelength of light transmitted on an optical fiber from one point on the network to another point on the network consuming a line-side port and a tributary port. For example, as shown in FIG. 3B, service channel 310 may provide access to 10 gigabytes of bandwidth capacity of WBB 302 using tributary ports 312 and 318.

Additionally, each of the one or more service channels associated with a WBB may be configured in a variety of ways. For example, a WBB may be arranged as a large block of reserved bandwidth including service channels that are all the same speed. For example, a WBB that reserves 100 gigabytes of bandwidth capacity may include ten (10) service channels, where each service channel is capable of providing 10 gigabytes of capacity. Alternatively, the WBB may be arranged as a medium block of bandwidth including a mixture of large and small bandwidth service channels. For example, a WBB that reserves 30 gigabytes of bandwidth capacity may include one 10 gigabyte service channel capable of providing 10 gigabytes of bandwidth capacity and eight 2.5 gigabyte service channels, where each individual 2.5 service channel is capable of providing 2.25 gigabytes of bandwidth capacity. In yet another example, the WBB may be a small block of reserved bandwidth including only small bandwidth channels. For example, a WBB that reserves 10 gigabytes of bandwidth capacity may include two 2.5 gigabyte service channels, each capable of providing 2.5 gigabytes of bandwidth capacity, 2 GIGE service channels, each capable of providing 1 gigabyte of bandwidth capacity, and two 1 gigabyte storage area network (SAN) service channel, each capable of providing 1 gigabyte of bandwidth capacity. Other arrangements may also be provided.

By provisioning a WBB with one or more service channels, a user, such as a network service provider customer, may save on the cost of accessing bandwidth capacity. For example, a customer may provision a WWB to reserve 100 gigabytes of bandwidth capacity and pay a $10,000 a month for the reservation. The WBB may have 5 service channels, each providing 20 gigabytes of bandwidth capacity. The customer may pay $20,000 per month for each service channel the customer actually uses over a given period of time. Assuming one service channel is activated for one month, the customer will pay $30,000 for the actual consumption of 20 gigabytes of bandwidth (the one service channel) and the reservation of 100 gigabytes of bandwidth, or 80 gigabytes more of bandwidth for use in the future if necessary. In contrast if the customer were to pay for dark fiber, the customer may have to pay for all 100 gigs of bandwidth via all five service channels as though they were currently being consumed, resulting in a fee of $100,000.

Referring again to FIG. 2, each network node server 216-220 (e.g. the servers at Building A Chicago 304 and Building B New York 306 of FIG. 3A) may include various pieces of equipment and/or the physical infrastructure required to provide data transmission, using all or part of the WBB. The network node servers may have components such as a physical chassis (e.g. a DWDM chassis) containing or otherwise operatively connected to base technologies such as: optical fiber(s), switches, routers, couplers, amplifiers, light directing/redirecting components, ports, fiber network cards positions, and/or any other physical components required to provide data transmission and/or otherwise facilitate communication with other network node servers in the network. Additionally, the network node server may also include a communication system to communicate via a wireline and/or wireless communications, such as through the Internet, a telecommunication network, a fiber optic network, and/or another communication network.

In some arrangements, however, a line card or cards may not be pre-installed at the network node servers. The network node servers 216-220 may thus require the installation of line cards, digital cards, and/or network cards, etc., to properly channelize, setup, establish, and/or activate the wavelength bandwidth capacity reserved by a WBB. Generally, a line card or a digital line card represents a modular electronic circuit on a printed circuit board that interfaces within a telecommunications network, such as in DWDM system. The cards are not pre-installed at the network node servers because the installation process for such cards may be time consuming and expensive. Thus, it may be optimal for services providers to wait until a consumer has purchased bandwidth capacity before spending time and money to install the cards.

A network operator installs the line card at a particular location when a customer purchases and/or provisions a WBB to reserve a specific amount of bandwidth capacity. The network operator is, for example, a company that owns and/or operates the equipment within each respective destination, such as a telecommunication service provider. Once a customer reserves a WBB the network operator may install the line cards. In particular, a line card may be installed at a network node server 216-220 to configure the reserved WBB and corresponding line and tributary ports into one or more service channels.

Figure 4:
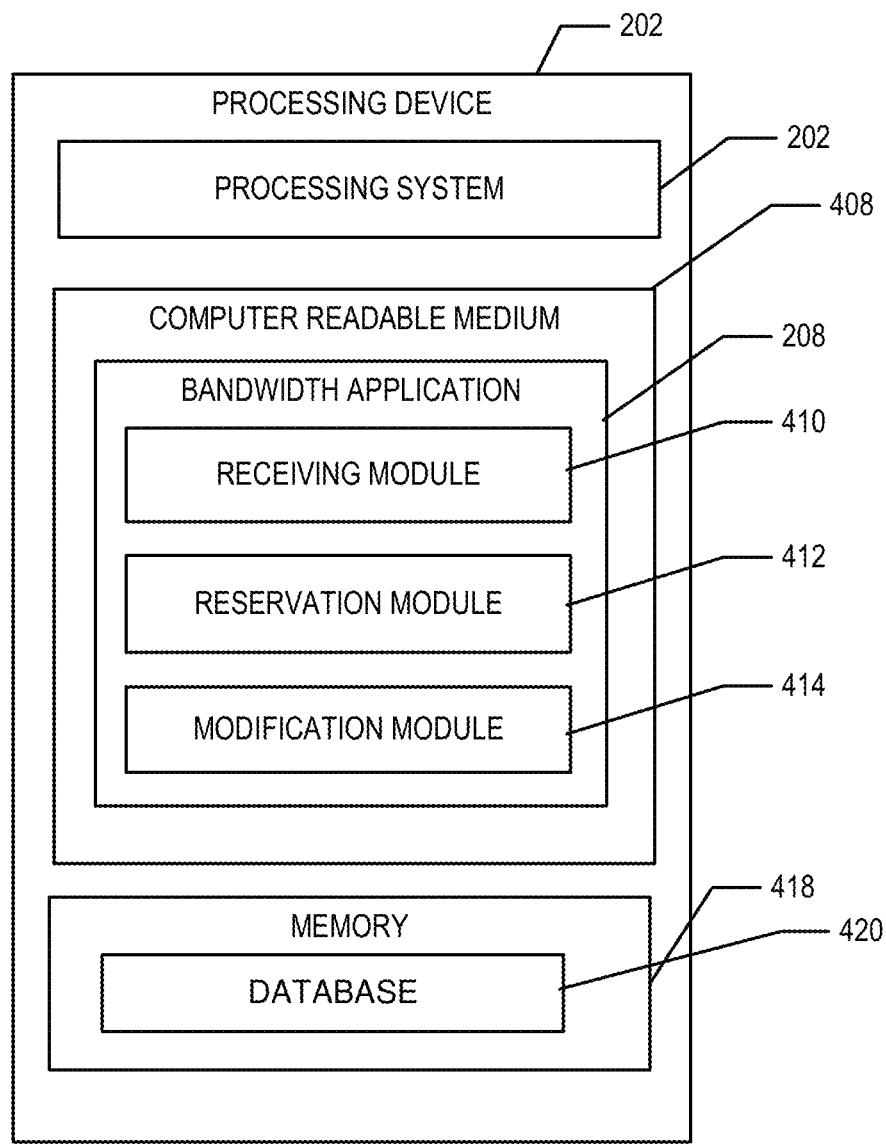
FIG. 4 is a block diagram of an example processing device, according to aspects of the present disclosure.

FIG. 4 is an example block diagram illustrating the various hardware and/or software components of the processing device 202 according to one exemplary embodiment of the present disclosure. The processing device 202 may include a processing system 402 that may be used to execute the bandwidth application 208 that automatically purchases and/or provisions a WBB to reserve a specific amount of bandwidth a network, such as an optical telecommunications network implementing DWDM. The processing system 402 may include memory and/or be in communication with a memory 418, which may include volatile and/or non-volatile memory. The processing system 402 may also include various other computing components. The processing device 202 may also include a database 420. The database 420 may be a general repository of data including bandwidth data, bandwidth information, WBB data and associated reservation information, etc. The database 420 may include memory and one or more processors or processing systems to receive, process, query and transmit communications and store and retrieve such data. In another aspect, the database 420 may be a database server.

The processing device 202 may include a computer readable media ("CRM") 408, which may include computer storage media, communication media, and/or another available computer readable media medium that can be accessed by the processing system 202. For example, CRM 408 may include non-transient computer storage media and communication media. By way of example and not limitation, computer storage media includes memory, volatile media, nonvolatile media, removable media, and/or non-removable media implemented in a method or technology for storage of information, such as machine/computer readable/executable instructions, data structures, program modules, or other data. Communication media includes machine/computer readable/executable instructions, data structures, program modules, or other data. The CRM 408 may store executable instructions to implement the bandwidth application 208 and/or associated functions, processes, etc. Generally, program modules include routines, programs, instructions, objects, components, data structures, etc., that perform particular tasks or implement particular abstract data types.

According to one aspect, the bandwidth application 208 may include a receiving module 410 that receives input, such as a request from a user, indicating that a user wants to purchase or otherwise provision a WBB to reserve a specific amount of bandwidth capacity between two nodes of a network. The input may include a description and/or quantification of the specific amount of bandwidth capacity the user wants to reserve. For example, a user may interact with the user device 204 to enter various mouse clicks and/or keystrokes as prompted by one or more screen shots via a web portal displayed on the user device to provide input indicating that the user wants to provision a WBB of reserving 20, 35, 60, 75, or 100 gigabytes of bandwidth capacity between two nodes, A and B of a optical telecommunications network.

A reservation module 412 may process the input received by the request module 410 and automatically provision a WBB reserving the specific amount of bandwidth described in the input by assigning one or more line-side capacity ports and one or more corresponding tributary capacity ports to a user at a network node server. For example, the reservation module 412 may process input received by the receiving module 208 from a user "C", indicating that C wants to reserve 100 gigabytes of bandwidth. Accordingly, the reservation module 412 may reserve 100 gigabytes of bandwidth on an optical DWDM network by assigning at least five line-side capacity ports and five corresponding tributary ports to the user. The line and tributary capacity ports may be configured as five individual service channels, each service channel capable of providing 20 (i.e. 5%) gigabytes of bandwidth of the maximum capacity of 100 gigabytes.

Once a WBB has been reserved, the reservation module 412 may automatically bill or otherwise initiate a billing process to charge the user a marginal flat rate for making the WBB reservation. Subsequently, once a user has been properly billed for provisioning a WBB, the reservation module 412 may automatically initiate a process to activate the network node servers between which the WBB is reserved. For example, the reservation module 412 may provide output (e.g. email, alerts, electronic messaging, etc) indicating to a network service provider that a specific network node server requires the installation of a line card. Alternatively, the reservation module 412 may automatically generate a ticket for processing, such as by a network service provider engineering department system that may initiate the installation of a line card.

A modification module 414 may receive modification input from the user to activate/deactivate and/or increase and/or decrease their bandwidth consumption within a WBB. For example, a user may interact with the user device 204 to enter various mouse clicks and/or keystrokes as prompted by one or more screen shots via a user web portal displayed on the user device 204 to provide input allowing the user to modify the user's bandwidth capacity and/or bandwidth consumption WBB. For example, the modification module 414 may receive the input to increase or decrease the bandwidth capacity within a given WBB for a specified period of time by activating or deactivating one or more line-side ports and corresponding tributary ports and/or one or more service channels. For example, the modification module 412 may receive input indicating that the user wants to increase their bandwidth capacity by activating an additional service channel for several hours, days, months, or any other type of temporal delineation. The modification module 414 may connect to and/or communicate with the one or more network node servers 216-218 to activate particular portions of the physical infrastructure within the network node server to effectively increase and/or decrease the bandwidth capacity currently being consumed. Once a WBB has been modified, the reservation module 412 may automatically bill or otherwise initiate a billing process to charge the user a rate for increasing their bandwidth consumption. Alternatively, the reservation module 412 may adjust an existing rate the user was paying to reflect a decrease in bandwidth consumption.

Figure 5:
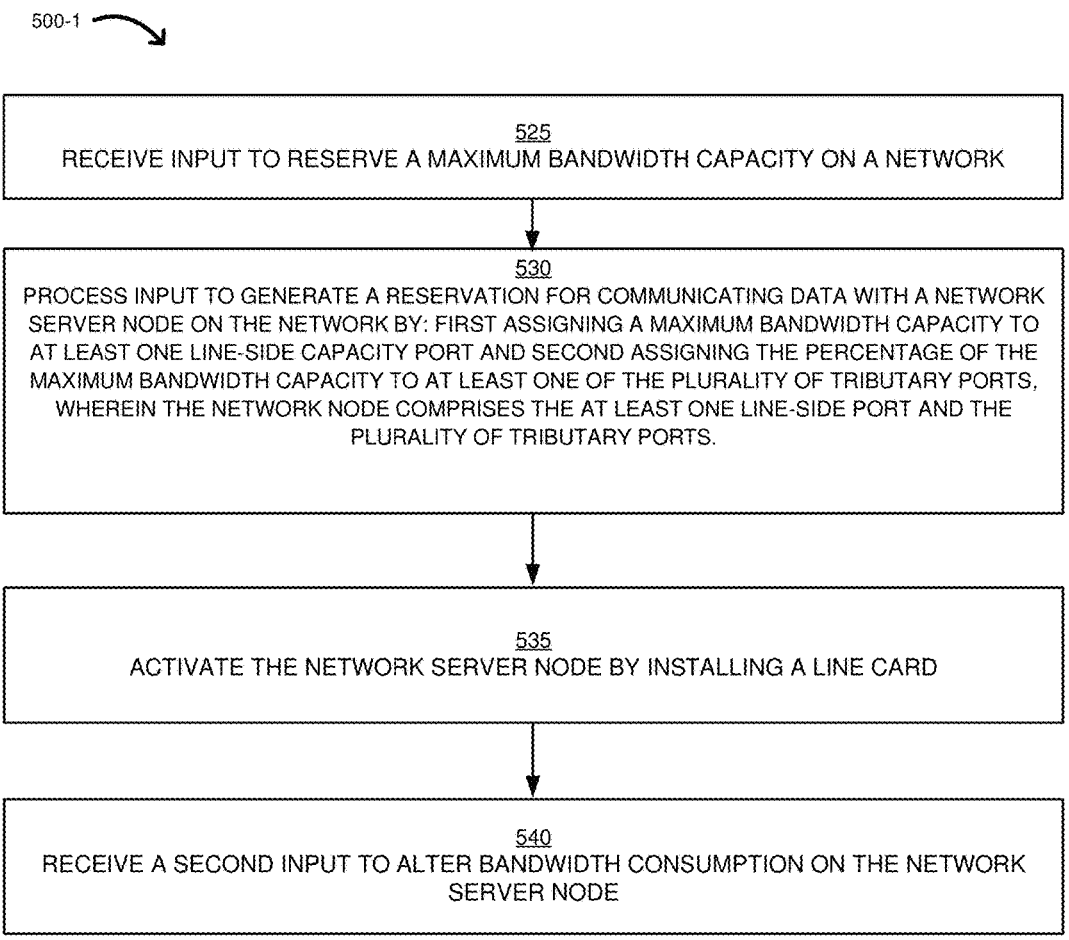
FIG. 5 is a flowchart illustrating an example process for reserving bandwidth capacity, according to aspects of the present disclosure.

FIG. 5 depicts an example method and/or process 500-1 for provisioning WBBs to reserve bandwidth capacity for users. Process 500-1 may be executed by at least one processor encoded with, or executing instructions of, a bandwidth application 208. Initially, at 525, process 500-1 includes receiving input to reserve a maximum bandwidth capacity on a network. For example, a data services enterprise ("DSA") is anticipating a short-term increase in bandwidth consumption in upcoming months because the company needs to make duplicate copies of all of its data for backup purposes. The DSA wants to increase its bandwidth capacity between its central office location, located on the east coast and its data warehouse, located on the west coast. Thus, the DSA may access a web portal, such as a customer portal, through a secure web-browser (e.g., Microsoft Explorer®, Mozilla Firefox®, Safari® or the like) on one or more of the user-interfaces 204-206 to provide input in response to a series of prompts. In particular, the DSA may provide input to reserve 100 gigabytes of bandwidth capacity, which is received by the bandwidth application 208.

At 530, after the bandwidth and/or order information has been received, the information is processed to generate a reservation for communicating data to and/or from a network node server on the network. In particular, the input processed by first assigning a maximum bandwidth capacity to at least one line-side capacity port on the network node server and assigning a percentage of the maximum bandwidth capacity to at least one of a plurality of tributary ports on the network node server. For example, WBB reserved by the DSA reserving 100 gigabytes of bandwidth capacity between its central location and data center location may include five service channels, where each of the five service channels is capable of providing access to 10 gigabytes of bandwidth. The DSA (i.e. the customer) is charged both a flat rate for the reservation and an additional varying rate for the DSA's actual bandwidth consumption.

Once the reservation has been made, the network node servers on the network are activated at 535. For example, physical infrastructure such as one or more line cards may be installed at the DSA's central location and data center location respectively, to allow for bandwidth capacity between the two locations based on the reservation made within the WBB.

At 535, second input to alter bandwidth consumption on the network node server is received. For example, the data services enterprise may require a large increase in bandwidth capacity in order to produce duplicate servers of all of its existing databases for backup purposes. Accordingly, an administrator of the data services enterprise may use the user device 204 to generate a request to activate 3 of the 5 service lines reserved within its WBB. Subsequently, the DSA's bandwidth consumption may increase by 30 gigabytes of bandwidth capacity. Subsequently, when the data duplication is finished, the administrator of the data services enterprise may use the user device 204 to access the customer web portal and generate a request to deactivate the 3 recently activate service channels, effectively reducing the data services enterprise usage back to previous levels. DSA will be charged for bandwidth consumption while the service channels were active.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various exemplary embodiments, it will be understood that these embodiments are illustrative and that the scope of the disclosure is not limited to them. Many variations, modifications, additions, and improvements are possible. More generally, embodiments in accordance with the present disclosure have been described in the context of exemplary implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for providing bandwidth comprising:
   a first network node server comprising:
     at least one line-side port to communicate data at a maximum bandwidth capacity on a network; and
     a plurality of tributary ports, each tributary port of the plurality of tributary ports for communicating the data at a percentage of the maximum bandwidth capacity; and
   at least one processor to:
     receive input to reserve the maximum bandwidth capacity on the network;
     process the input to generate a reservation for communicating data by:
       assigning the maximum bandwidth capacity to the at least one line-side capacity port; and
       assigning the percentage of the maximum bandwidth capacity to at least one of the plurality of tributary ports.

2. The system as recited in claim 1, wherein receiving input for an amount of bandwidth comprises conducting a dialog with a user on a display prompting the user to provide the input via a web portal.

3. The system as recited in claim 1, wherein the processor is further configured to:
   receive a second input to decrease bandwidth consumption on the first network node server by deactivating the at least one plurality of tributary ports.

4. The system as recited in claim 1, wherein the network is an optical telecommunications network.

5. The system as recited in claim 1, wherein the reservation corresponds to a wavelength bandwidth block.

6. The system as recited in claim 1, wherein the processor is further configured to activate the first network node server by initiating the installation of a line card.

7. A system for providing bandwidth comprising:
   a first network node server comprising:
     at least one line-side port to communicate data at a maximum bandwidth capacity on a network; and
     a plurality of tributary ports, each tributary port of the plurality of tributary ports for communicating the data at a percentage of the maximum bandwidth capacity; and
   a second network node server comprising:
     at least one other line-side port to communicate the data at the maximum bandwidth capacity on the network; and
   at least one processor to:
     receive input to reserve the maximum bandwidth capacity on the network;
     process the input to generate a reservation for communicating data between the first network node server and the second network node server by:
       assigning the maximum bandwidth capacity to the at least one line-side capacity port; and
       assigning the percentage of the maximum bandwidth capacity to at least one of the plurality of tributary ports.

8. The system as recited in claim 7, wherein the processor is further configured to:
   receive a second input to decrease bandwidth consumption on the first network node server by:
     deactivating the at least one tributary ports of the plurality of tributary ports.

9. The method as recited in claim 7, wherein the network is an optical telecommunications network.

10. The system as recited in claim 7, wherein the reservation corresponds to a wavelength bandwidth block.

11. The system as recited in claim 7, wherein the processor is further configured to activate the first network node server by initiating the installation of a line card.

12. A method for reserving bandwidth comprising:
    receiving, at a processor, input to reserve a maximum bandwidth capacity on a network;
    processing, at the at least one processor, the input to generate a reservation for communicating data with a network node server within the network by:
      assigning a maximum bandwidth capacity to at least one line-side capacity port; and
      assigning the percentage of the maximum bandwidth capacity to at least one of the plurality of tributary ports, wherein the network node server comprises the at least one line-side port and the plurality of tributary ports.

13. The method as recited in claim 12, further comprising receiving a second input to decrease bandwidth consumption by the network node server by deactivating the at least one plurality of tributary ports.

14. The method as recited in claim 12, wherein the network is an optical telecommunications network.

15. The method as recited in claim 12, wherein the reservation corresponds to a wavelength bandwidth block.

16. The method as recited in claim 12, further comprising activating the network node server by initiating the installation of a line card.

* * * * *